United States Patent
Nam et al.

(10) Patent No.: US 8,300,102 B2
(45) Date of Patent: Oct. 30, 2012

(54) APPARATUS AND METHOD FOR INFERENCING TOPOLOGY OF MULTIPLE CAMERAS NETWORK BY TRACKING MOVEMENT

(75) Inventors: Yun Young Nam, Suwon-si (KR); Jung Hun Ryu, Suwon-si (KR); We-Duke Cho, Seongnam-si (KR)

(73) Assignee: AJOU University Industry Cooperation Foundation, Suwon-si (KR)

( * ) Notice: Subject to any disclaimer, the term of this patent is extended or adjusted under 35 U.S.C. 154(b) by 344 days.

(21) Appl. No.: 12/675,682

(22) PCT Filed: Oct. 23, 2007

(86) PCT No.: PCT/KR2007/005225
§ 371 (c)(1),
(2), (4) Date: Feb. 26, 2010

(87) PCT Pub. No.: WO2009/028761
PCT Pub. Date: Mar. 5, 2009

(65) Prior Publication Data
US 2010/0231723 A1   Sep. 16, 2010

(30) Foreign Application Priority Data
Aug. 27, 2007  (KR) .................. 10-2007-0086253

(51) Int. Cl.
*H04N 5/225*   (2006.01)
*G06K 9/00*    (2006.01)

(52) U.S. Cl. ................... 348/169; 348/E5.024; 382/103

(58) Field of Classification Search ............. 348/137, 348/139, 143, 169, 218.1, 222.1, E5.024; 382/103, 106, 107
See application file for complete search history.

(56) References Cited

U.S. PATENT DOCUMENTS
7,450,735 B1 * 11/2008 Shah et al. ................. 382/103

| | | | |
|---|---|---|---|
| 2005/0185054 A1 * | 8/2005 | Edwards et al. | 348/169 |
| 2007/0237360 A1 * | 10/2007 | Irie et al. | 382/103 |
| 2010/0045799 A1 * | 2/2010 | Lei et al. | 348/169 |

FOREIGN PATENT DOCUMENTS
JP   2004199378 A * 7/2004
JP   2004258925 A * 9/2004

OTHER PUBLICATIONS

Ellis et al., "Learning a Multi-Camera Topology"., Joint IEEE Workshop on Visual Surveillance and Performance Evaluation of Tracking and Surveillance (VS-PETS), p. 165-171, 2003.*

(Continued)

*Primary Examiner* — Quang N Nguyen
*Assistant Examiner* — Kostas Katsikis
(74) *Attorney, Agent, or Firm* — Stein McEwen, LLP (57) ABSTRACT

Provided are an apparatus and a method for tracking movements of objects to infer a topology of a network of multiple cameras. The apparatus infers the topology of the network formed of the multiple cameras that sequentially obtain images and includes an object extractor, a haunting data generator, and a haunting database (DB), and a topology inferrer. The object extractor extracts at least one from each of the obtained images, for the multiple cameras. The haunting data generator generates appearing cameras and appearing times at which the moving objects appear, and disappearing cameras and disappearing times at which the moving objects disappear, for the multiple cameras. The haunting DB stores the appearing cameras and appearing times and the disappearing cameras and disappearing times of the moving object, for the multiple cameras. The topology inferrer infers the topology of the network using the appearing cameras and appearing times and the disappearing cameras and disappearing times of moving objects. Therefore, the apparatus accurately infers topologies and distances among the multiple cameras in the network of the multiple cameras using the cameras and appearing and disappearing times at which the moving objects appear and disappear. As a result, the apparatus accurately track the moving objects in the network.

9 Claims, 7 Drawing Sheets

OTHER PUBLICATIONS

Tieu et al., Inference of Non-Overlapping Camera Network Topology by Measuring Statistical Dependence, Computer Vision, 2005. ICCV 2005., Tenth IEEE International Conference on , vol. 2, No., pp. 1842-1849 vol. 2, Oct. 17-21, 2005.*

Baldassarri et al., Visual Self-Localisation Using Automatic Topology Construction, Image Analysis and Processing, 2003.Proceedings. 12th International Conference on , vol., No., pp. 368-373, Sep. 17-19, 2003.*

Nam, Y., et al., "Inference of Multiple Cameras Network Topology by Tracking Human Movement" with translation and title of Learning Spatio-Temporal Topology of a Multiple Cameras Network by Tracking People, Proceedings of Korea Computer Congress, pp. 466-470, Jun. 2007.

* cited by examiner

|  | c1 | o1 | c2 | no1 | c3 | no2 | c4 | no3 | c5 | v1 |
|---|---|---|---|---|---|---|---|---|---|---|
| c1 | 0 | 8 | 0 | 0 | 0 | 0 | 0 | 0 | 0 | 0 |
| o1 | 8 | 0 | 2 | 0 | 0 | 0 | 0 | 0 | 0 | 0 |
| c2 | 0 | 2 | 0 | 5 | 0 | 0 | 0 | 0 | 0 | 0 |
| no1 | 0 | 0 | 5 | 0 | 1 | 0 | 0 | 0 | 0 | 0 |
| c3 | 0 | 0 | 0 | 1 | 0 | 1 | 0 | 4 | 0 | 0 |
| no2 | 0 | 0 | 0 | 0 | 1 | 0 | 1 | 0 | 0 | 0 |
| c4 | 0 | 0 | 0 | 0 | 0 | 1 | 5 | 0 | 0 | 0 |
| no3 | 0 | 0 | 0 | 0 | 4 | 0 | 0 | 0 | 0 | 0 |
| n5 | 0 | 0 | 0 | 0 | 0 | 0 | 0 | 0 | 0 | 8 |
| v1 | 0 | 0 | 0 | 0 | 0 | 0 | 0 | 0 | 8 | 3 |

c : IMAGE NODE
o : OVERLAPPING NODE
no : NON-OVERLAPPING NODE
v : VIRTUAL NODE
——: VISIBLE EDGE
===: OVERLAPPING EDGE
---: INVISIBLE EDGE

APPARATUS AND METHOD FOR INFERENCING TOPOLOGY OF MULTIPLE CAMERAS NETWORK BY TRACKING MOVEMENT

This is a National Phase Application filed under 35 U.S.C. 371 as a national stage of PCT/KR2007/005225, filed on Oct. 23, 2007, an application claiming foreign priority benefits under 35 USC 119 of Korean Application No. 10-2007-0086253, filed on Aug. 27, 2007, the content of each of which is hereby incorporated by reference in its entirety.

TECHNICAL FIELD

The present invention relates to a network of multiple cameras, and more particularly, to an apparatus and a method for tracking movements of objects to infer a topology of a network of multiple cameras.

BACKGROUND ART

Accidents and crimes have been increased with the complexity and diversity of modern society. Thus, safety and surveillance have been increasingly demanded. In order to satisfy the demand of safety and surveillance, unmanned monitoring systems, etc. have been developed to monitor principal facilities and keep public security in crime-ridden districts.

As a practical and economic alternative, such unmanned monitoring systems have been developed into intelligent monitoring systems, which detect and track moving objects, beyond the development of Digital Video Recorders (DVRs). Such intelligent monitoring system technology is to detect and distinguish moving objects from image sequences. In order to realize such intelligent monitoring system technology, there is required technology for automatically distinguishing and tracking objects in the environments of multiple monitoring cameras.

In the early algorithms for tracking objects, several cameras track objects using camera calibration and overlapping Fields of View (FOV). As one of such algorithms, there is a method of constituting cameras using a compensated camera to overlap viewers with one another and then calculating handovers of tracked objects.

Another method is to track objects in cameras of which viewers do not overlap with one another. In other words, in this method, the viewers do not overlap with one another in the cameras in order to match transition times of the objects with shapes of the objects. However, in this method, the transition times of the objects must be used, and moving methods of people must be pre-informed.

There is another method of describing motion patterns of objects from two cameras using a stochastic transition matrix. This method requires learned data in order to confirm coherences among the cameras.

Besides the above-described method, there is a method of constituting a re-entry period and then using objects that are observed within a given time. In this method, the re-entry period is expressed as a histogram using the observed objects, and links among cameras are detected based on the histogram.

There is another method of modeling posterior probability distributions and color variations of space-time links among cameras using progressive learning. This method is to verify coherences of objects in multiple cameras that do not overlap, based on a progressive learning process for similarities among colors. Here, the similarities among the colors are determined using a Consensus-Color Conversion of Munsell (CCCM) color space. Links among the multiple cameras are determined after the determinations of the similarities among the colors.

In the above-method, entries and re-entries of objects are calculated as conditional transition probabilities within a given time to determine the links among the multiple cameras. Here, in order to further accurately determine the links, blocks within screens of the multiple cameras are divided into maximally small sizes to remove unnecessary links and sort out effective links. After the links are sorted out, the posterior probability distributions are used to further accurately determine the coherences of objects that are observed among links.

Another method is to confirm coherences of objects using relations between FOV lines in the environment in which camera viewers do not overlap with one another in real-time situations. In this method, the FOV lines of the cameras, which do not overlap with one another, extend to form virtual lines, and then minimum distances from the virtual lines to estimated positions of objects are calculated in order to determine whether the objects are the same objects.

In the above-described object tracking methods, cameras are constituted using various methods. Here, the cameras may be classified into single cameras and multiple cameras. Also, the multiple cameras may be classified into overlapping multiple cameras and non-overlapping multiple cameras according to whether images overlap with one another. The overlapping multiple cameras overlap camera images, while the non-overlapping multiple cameras do not overlap camera images.

The single cameras are mainly used to perform defined functions of specific spatial areas like over-speeding car regulating cameras. The multiple cameras are used to keep and monitor safety in indoor and outdoor wide areas. The overlapping multiple cameras are used to allow two or more cameras to share a predetermined area so as to minutely analyze images or used to produce 3-dimensional (3-D) images through stereo vision technology.

However, the non-overlapping multiple cameras are mainly used in monitoring systems for wide areas due to installation and maintenance cost. External identifiers of objects and haunting time intervals of the objects must be considered to track the objects in the non-overlapping multiple cameras.

DETAILED DESCRIPTION OF THE INVENTION

Technical Problem

The present invention provides an apparatus and method for tracking movements of objects to infer a topology of a network of multiple cameras.

Technical Solution

According to an aspect of the present invention, there is provided an apparatus for tracking movements of objects to infer a topology of a network of multiple cameras sequentially obtaining images, including an object extractor, a haunting data generator, a haunting database (DB), and a topology inferrer. The object extractor may extract at least one moving object from each of the obtained images, for the multiple cameras. The haunting data generator may generate appearing cameras and appearing times at which the moving objects appear, and disappearing cameras and disappearing times at which the moving objects disappear, for the multiple cameras. The haunting DB may store the appearing cameras and appearing times and the disappearing cameras and disappearing times of the moving objects, for the multiple cameras. The topology inferrer may infer the topology of the network using the appearing cameras and appearing times and the disappearing cameras and disappearing times of the moving objects.

The object extractor may include a moving object extractor and a characteristic extractor. The moving object extractor may remove background areas from the obtained images to obtain foreground areas so as to extract the foreground areas as the moving objects. The characteristic extractor may extract characteristics of the moving objects.

The haunting data generator may determine cameras on which the moving objects appear, as the appearing cameras and times at which the moving objects appear, as the appearing times if the moving objects appear on the cameras, and if the moving objects disappear from the cameras, determine the cameras from which the moving objects disappear, as the disappearing cameras and times at which the moving objects disappear, as the disappearing times.

According to another aspect of the present invention, there is provided a method of tracking movements of objects to infer a topology of a network of multiple cameras, including: sequentially obtaining images from the multiple cameras; extracting at least one moving object from each of the obtained images; determining and registering appearing cameras and appearing times at which the moving objects appear, and disappearing cameras and disappearing times at which the moving objects disappear, for the multiple cameras; and inferring the topology of the network using the appearing cameras and appearing times and the disappearing cameras and disappearing times.

The extraction of the moving objects may include removing background areas from the obtained images to obtain foreground areas so as to extract the foreground areas as the moving objects.

The determination and registration of the appearing cameras and appearing times and the disappearing cameras and disappearing times may include: if the moving objects appear on the cameras, determining the cameras on which the moving objects appear, as the appearing cameras and times at which the moving objects appear, as the appearing times; and if the moving objects disappear from the cameras, determining the cameras from which the moving objects disappear, as the disappearing cameras and times at which the moving objects disappear, as the disappearing times.

The inference of the topology may include: if the moving objects appear on the cameras, determining whether the moving objects are new moving objects; if the moving objects are the new moving objects, registering the moving objects and generating image nodes of the appearing cameras, and if the moving objects are registered moving objects, comparing moving times of the moving objects with a threshold moving time; and if the moving times are greater than the threshold moving time, re-registering the moving objects as new moving objects and generating image nodes of the appearing cameras, and if the moving times are not greater than the threshold moving time, comparing the appearing cameras with previous disappearing cameras to determine the topology of the network.

The extraction of the moving objects may include extracting characteristics of the moving objects, and the determination of whether the moving objects are the new moving objects may include comparing the characteristics of the moving objects with characteristics of previously extracted moving objects to determine whether the moving objects are the new moving objects.

The determination of the topology of the network may include: if the previous disappearing cameras are not registered or the appearing cameras of the moving objects are not the same as the previous disappearing cameras, determining whether the moving objects disappear from other cameras to generate image nodes or overlapping nodes; and if the appearing cameras of the moving objects are the same as the previous disappearing cameras, generating virtual nodes of the appearing cameras.

The generation of the virtual nodes may include generating invisible edges to the virtual nodes, wherein weights of the invisible edges to the virtual nodes are the moving times.

The generation of the image nodes or the overlapping nodes may include: if the moving objects do not appear on the other cameras, generating the image nodes of the appearing cameras; and if the moving objects appear on the other cameras, generating overlapping nodes between the appearing cameras and the other cameras.

The generation of the image nodes may include generating invisible edges to the image nodes, and the generation of the overlapping nodes may include generating visible edges to the overlapping nodes, wherein weights of the invisible edges to the image nodes and weights of the visible edges to the overlapping nodes are the moving times.

The method may further include: if the moving objects disappear from the cameras, determining whether the moving objects appear on other cameras except the disappearing cameras; if the moving objects do not appear on the other cameras, generating non-overlapping nodes; and if the moving objects appear on the other cameras, determining whether previous appearing cameras are the same as the disappearing cameras to generate camera nodes or regression visible edges.

The generation of the camera nodes or the regression visible edges may include: if the previous appearing cameras are not the same as the disappearing cameras, generating image nodes of the disappearing cameras; and if the previous appearing cameras are the same as the disappearing cameras, generating regression visible edges that regress to the disappearing cameras.

The generation of the image nodes of the disappearing cameras may include generating overlapping edges to the image nodes, wherein weights of the overlapping edges to the image nodes and weights at the regression visible edges are the moving times.

Advantageous Effects

In an apparatus for inferring a topology of a network of multiple cameras according to an embodiment of the present invention, topologies and distances among the multiple cameras may be accurately measured in the network of the multiple cameras using appearing and disappearing cameras and appearing and disappearing times at which moving objects appear and disappear. Thus, the moving objects may be accurately tracked in the network.

BEST MODE FOR CARRYING OUT THE INVENTION

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Figure 1:
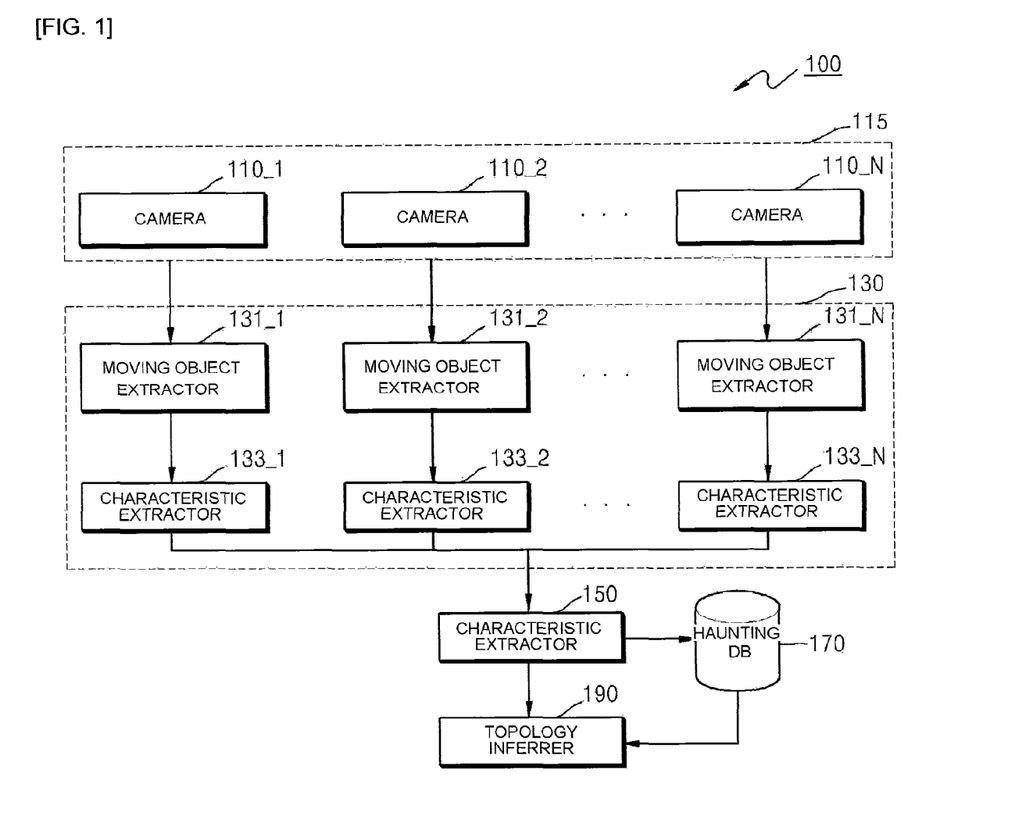
FIG. 1 is a block diagram of an apparatus for tracking movements of objects to infer a topology of a network of multiple cameras according to an embodiment of the present invention.

FIG. 1 is a block diagram of an apparatus for tracking movements of objects to infer a topology of a network of multiple cameras according to an embodiment of the present invention. Referring to FIG. 1, a topology inferring apparatus 100 according to the present embodiment infers a topology of a network 115 that includes multiple cameras 110_1 through 110_N that sequentially obtain images. The topology inferring apparatus 100 includes an object extractor 130, a haunting data generator 150, a haunting database (DB) 170, and a topology inferrer 190.

The object extractor 130 extracts at least one movement from an image that is obtained by each of the multiple cameras 110_1 through 110_N. For convenience, it is described in the present embodiment that the object extractor 130 extracts movements respectively from the multiple cameras 1101 through 110_N. While this is only an example, it will be understood by those of ordinary skill in the art that the object extractor 130 may be realized in various forms.

The object extractor 130 includes moving object extractors 131_1 through 131_N and characteristic extractors 133_1 through 133_N. The moving object extractors 131_1 through 131_N remove background areas from the images that are obtained by the multiple cameras 110_1 through 110_N to obtain foreground areas and then extract the foreground areas as moving objects. The characteristic extractors 133_1 through 133_N extract characteristics of the moving objects.

The haunting data generator 150 generates appearing camera and appearing times at which moving objects appear, and disappearing cameras and disappearing times at which the moving objects disappear, for the multiple cameras 110_1 through 110_N.

Moving objects haunt, i.e., appear on and/or disappear from, cameras with the movements of the moving objects. In this case, the haunting data generator 150 may detect when the moving objects haunt (appear on and/or disappear from) which cameras (appearing cameras or disappearing cameras) to generate haunting data (the appearing cameras and appearing times, and the disappearing cameras and disappearing times).

In more detail, if the moving objects appear cameras, the haunting data generator 150 may determine cameras on which the moving objects appear, as appearing cameras, and times at which the moving objects appear, as appearing times, in order to generate haunting data. If the moving objects disappear from the cameras, the haunting data generator 150 may determine cameras from which the moving objects disappear, as disappearing cameras, and times at which the moving objects disappear, as disappearing times, in order to generate haunting data.

The haunting DB 170 stores the appearing cameras and appearing times and the disappearing cameras and disappearing times of the moving objects respectively for the multiple cameras 110_1 and 110_N. It will be understood by those of ordinary skill in the art that haunting data may be stored using various methods besides the above-described method.

The topology inferrer 190 infers the topology of the network 115 using the appearing cameras and times and the disappearing cameras and times of the moving objects. In the present embodiment, the topology inferrer 190 compares haunting data of a currently appearing or disappearing moving object with previously stored haunting data of the currently appearing or disappearing moving object whenever moving objects appear or disappear, in order to infer the topology. An operation of the topology inferring apparatus 100, in particular, an operation of the topology inferrer 190, will now be described in detail with reference to FIGS. 1 through 5.

Figure 2:
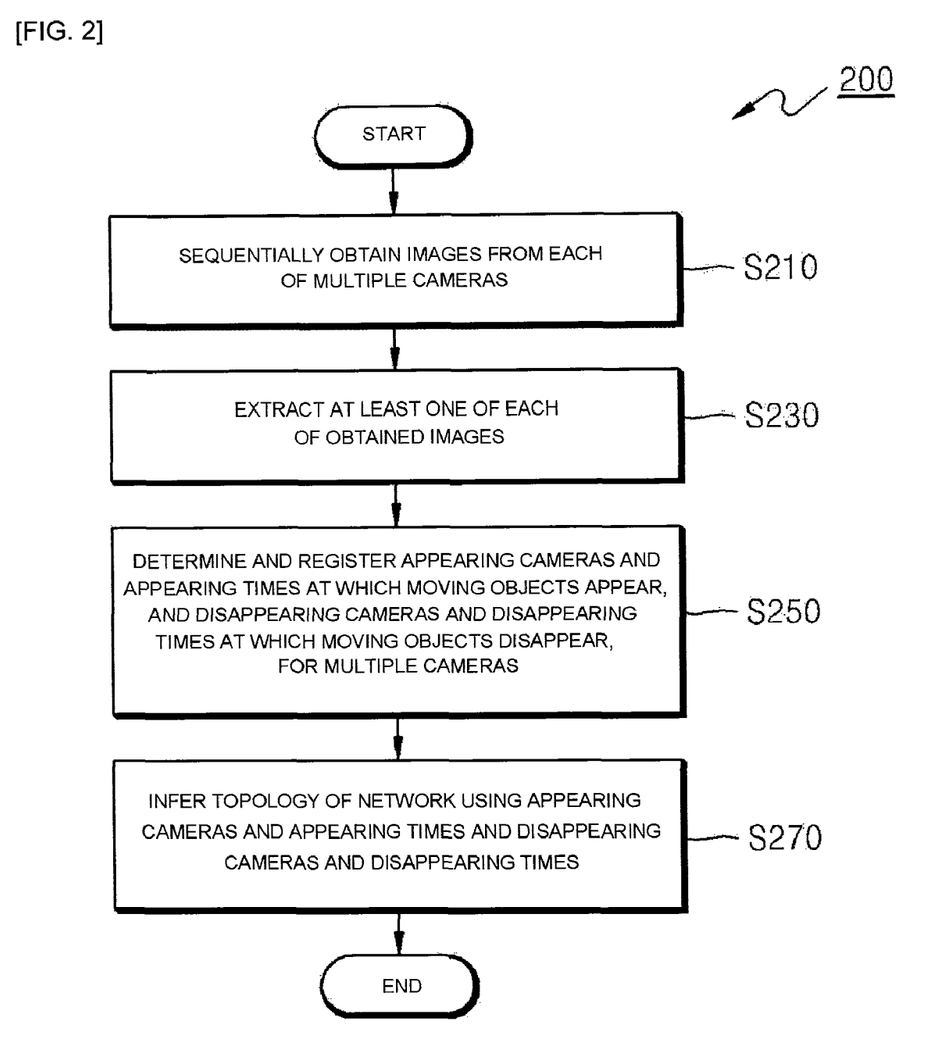
FIG. 2 is a flowchart of a method of tracking movements of objects to infer a topology of a network of multiple cameras according to an embodiment of the present invention.

FIG. 2 is a flowchart of a method of tracking movements of objects to infer a topology of a network of multiple cameras according to an embodiment of the present invention. In operation S210, the multiple cameras 110_1 through 110_N respectively sequentially obtain images in order to detect haunts of moving objects.

In operation S230, the object extractor 130 extracts at least one moving object from each of the images that are obtained by the multiple cameras 110_1 through 110_N. Here, the object extractor 130 may further extract characteristics of the moving objects. In other words, as described above, the moving object extractors 131_1 through 131_N remove background areas from the obtained images to obtain foreground areas and extract the foreground areas as the moving objects.

In the present embodiment, the moving object extractors 131_1 through 131_N may use a robust segmentation that complexly uses color, edge, movement, and disparity information, in order to extract the foreground areas.

In other words, the moving object extractors 131_1 through 131_N calculate smooth disparities of the obtained images, compare colors, edges, movements, and disparities, and separate the moving objects from static backgrounds. Also, when it is assumed that the disparities of the moving objects are smoothly changed within limited disparity ranges, i.e., limited depth ranges, to separate only the moving objects, the moving object extractors 131_1 through 131_N track moving objects including depth information among the separated moving objects in order to extract the moving objects.

The characteristic extractors 133_1 through 133_N extract characteristics of the moving objects that are extracted using the above-described method. In the present embodiment, the characteristic extractors 133_1 through 133_N may extract the characteristics of the moving objects using a grid patch classification method. If the grid patch classification method is used, the characteristic extractors 133_1 through 133_N split appearances of blobbed moving objects (e.g., persons) into respective parts in the foreground areas. In the present embodiment, if a moving object is a person, the characteristic extractors 133_1 through 133_N divide the moving object into a head, a body, hands, legs, etc. in order to use a hair color, whether the person wears a hat, clothes colors, etc. as identifiers of the moving object.

As will be described later, in operation S270, the topology inferrer 190 to determine coherences of the moving objects when inferring the topology of the network 115 of the multiple cameras. Here, characteristics of the moving objects, e.g., hair colors, whether the moving objects wear hats, clothes colors, etc., may be used as identifiers of the moving objects.

Referring to FIG. 2 again, in operation S250, the haunting data generator 150 determines and registers appearing cameras and appearing times at which the moving objects appear, and disappearing cameras and disappearing times at which the moving objects disappear, for the multiple cameras.

Figure 3:
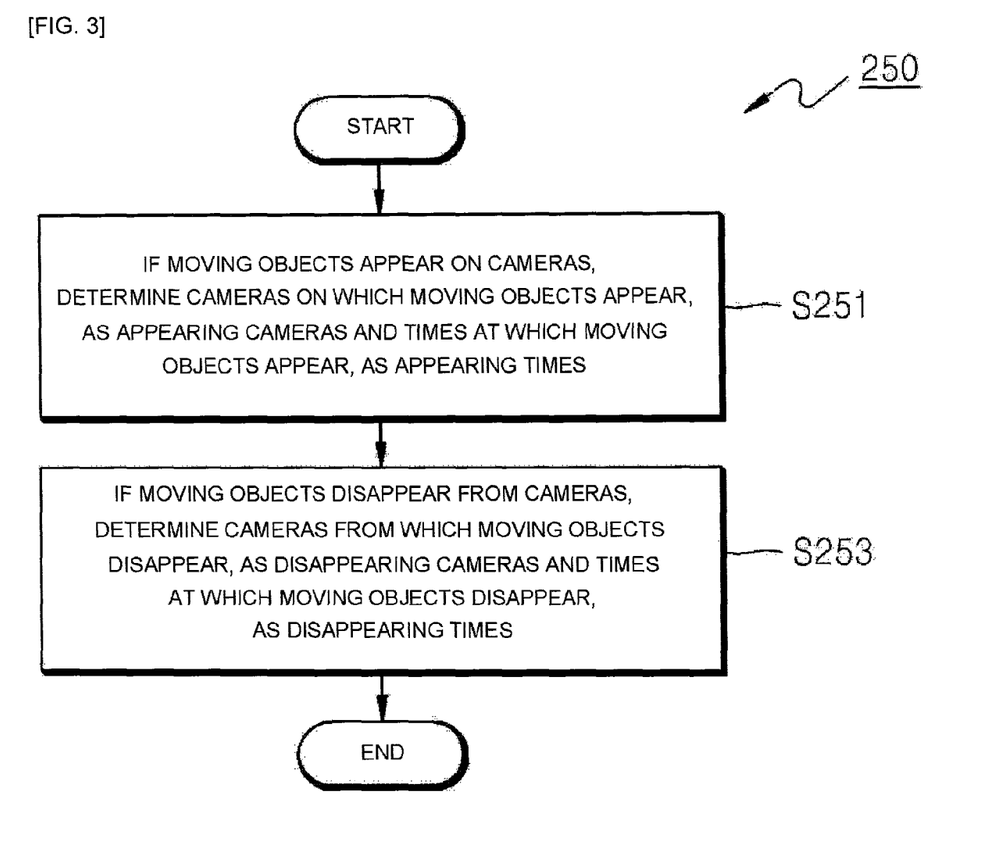
FIG. 3 is a flowchart of operation 250 of the method of FIG. 2.

FIG. 3 is a flowchart of operation S250 of the method of FIG. 2. If the moving objects appear on cameras as described above, the haunting data generator 150 determines the cameras on which the moving objects appear, as appearing cameras, and times at which the moving objects appears as appearing times, in order to generate haunting data in operation S251. If the moving objects disappear from the cameras, the haunting data generator 150 determines the cameras from which the moving objects disappear, as disappearing cameras, and times at which the moving objects disappear, as disappearing times, in order to generate haunting data in operation S253. The generated haunting data, i.e., the appearing cameras and appearing times and the disappearing cameras and disappearing times, are stored in the haunting DB 170.

As previously described, in operation S270, the topology inferrer 190 infers the topology of the network 115 using the appearing cameras and appearing times and the disappearing cameras and disappearing times. The topology inferrer 190 compares haunting data of appearing or disappearing moving objects with previously stored haunting data whenever the moving objects appear or disappear, in order to infer the topology. The case whether the moving objects appear will be described separately from the case whether the moving objects disappear in order to describe the operation of the topology inferrer 190 with reference to FIGS. 4 and 5.

Figure 4:
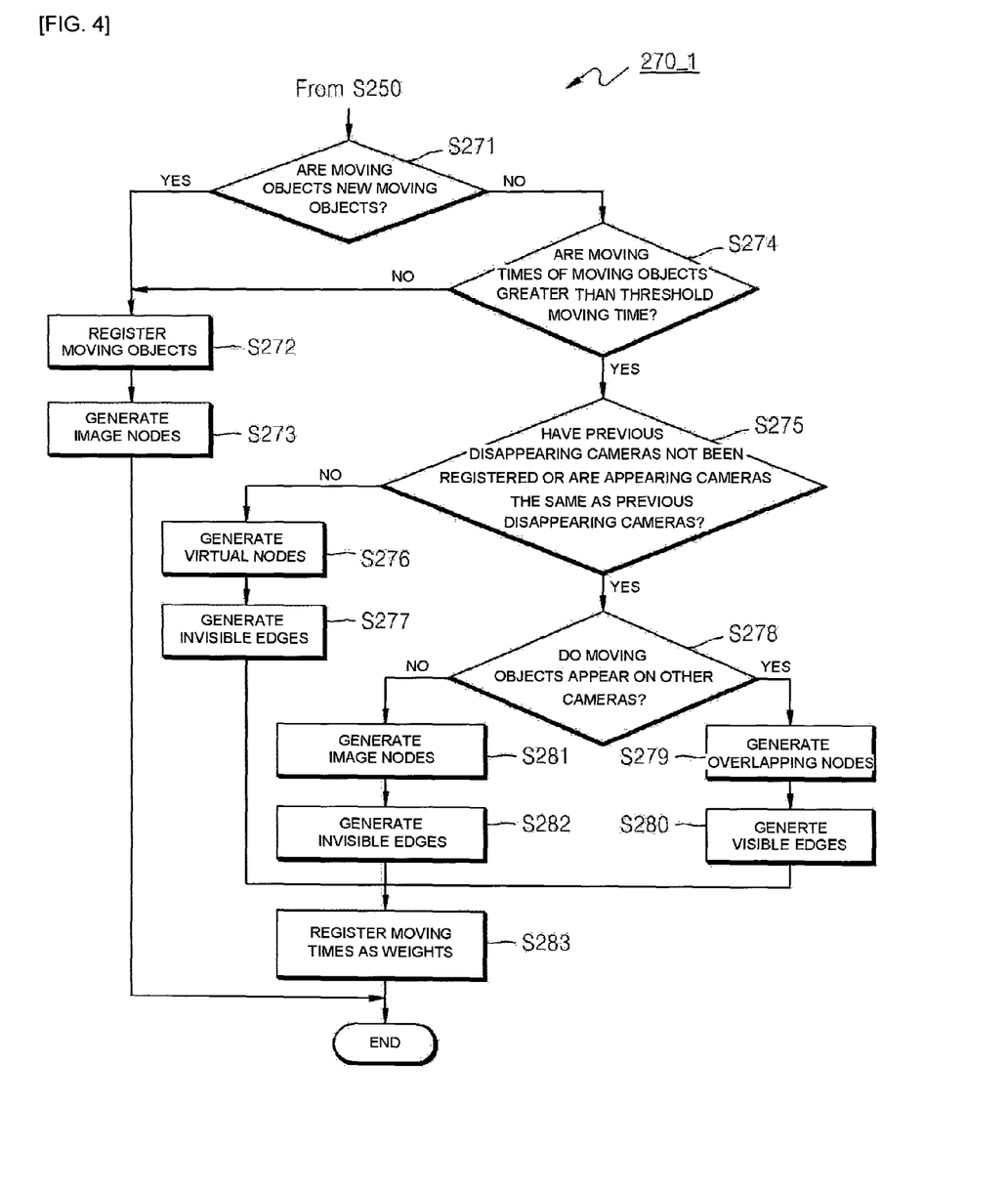
FIG. 4 is a flowchart of a part 270_1 of operation 270 of the method of FIG. 2.

FIG. 4 is a flowchart of a part 270_1 of operation 270 of the method of FIG. 2, i.e., a flowchart of a case whether moving objects appear on cameras. If the moving objects appear on the cameras, appearing cameras and appearing times of the moving objects obtained in the above-described operations are registered.

Referring to FIG. 4, in operation S271, the topology inferrer 190 determines whether a moving object currently appearing on cameras is a new moving object. As previously described, the object extractor 130 may extract moving objects along with characteristics of the moving objects. In the present embodiment, the characteristic extractors 133_1 through 133_N may extract characteristics of moving objects, e.g., hair colors, clothes colors, body sides, etc. In this case, the topology inferrer 190 may compare characteristics of the current moving object with characteristics of a previous moving object to determine whether the current moving object is a new moving object.

If it is determined in operation S 271 that the currently appearing moving object is the new moving object, the topology inferrer 190 registers the currently appearing moving object in operation S272. In operation S273, the topology inferrer 190 generates image nodes of the cameras on which the current moving object appears, i.e., image nodes of appearing cameras corresponding to the current moving object.

If it is determined in operation S271 that the current moving object is not the new moving object, i.e., the current moving object is a previously registered moving object, the topology inferrer 190 compares a moving time of the current moving object with a threshold moving time. Here, the moving time refers to a time interval between neighboring events of consecutive events (i.e., appearing or disappearing events) occurring in a moving object. Thus, if a moving object appears, a moving time corresponds to a difference between an appearing time of the moving object and a time at which the moving object disappears or appears just before appearing.

Moving objects may move within the network 115. Alternatively, the moving objects may leave from the network 115 and then enter the network 115. The latter case corresponds to a situation that is not necessary for inferring a topology, and such a situation is required to be excluded. In the present embodiment, if time intervals among events consecutively occurring in moving objects are within the threshold moving time, the topology inferrer 190 determines that the moving objects have moved within the network 115.

Therefore, if the moving times are greater than the threshold moving time, the topology inferrer 190 determines that the moving objects have left from the network 115 and then entered the network 115. In other words, the topology inferrer 190 re-registers the current moving object as the new moving object in operation S272 and then generates image nodes of the appearing cameras in operation S273.

If the moving times are not greater than the threshold moving time, the topology inferrer 190 compares the appearing cameras with cameras from which the current moving object disappeared previously, i.e., previous disappearing cameras, in operation S275 in order to determine the topology of the network 115. An operation of determining a topology of a network by comparing previous disappearing cameras will now be described.

If the appearing cameras are the same as the previous disappearing cameras, the topology inferrer 190 generates virtual nodes of the appearing cameras in operation S276 and generates invisible edges to the virtual nodes in operation S277. The topology inferrer 190 registers the moving times as weights of the invisible edges to the virtual nodes in operation S283.

If the previous disappearing cameras are not registered or the appearing cameras are not the same as the previous disappearing cameras, the topology inferrer 190 determines whether the moving objects have appeared on other cameras, in operation S278 in order to generate image nodes or overlapping nodes.

In more detail, if the moving objects do not appear on the other cameras, the topology inferrer 190 generates image nodes of the appearing cameras in operation S281 and generates invisible edges to the image nodes in operation S282. The topology inferrer 190 registers the moving times as weights of the invisible edges to the image nodes in operation S283.

If the moving objects appear on the other cameras, the topology inferrer 190 generates overlapping nodes between the appearing cameras and the other cameras in operation S279 and generates visible edges to the overlapping nodes in operation S280. In operation S283, the topology inferrer 190 registers the moving times as weights of the visible edges to the overlapping nodes.

It has been described the operation of the topology inferrer 190 when moving objects appear on cameras. An operation of the topology inferrer 190 when the moving objects disappear from the cameras will now be described with reference to FIG. 5.

Figure 5:
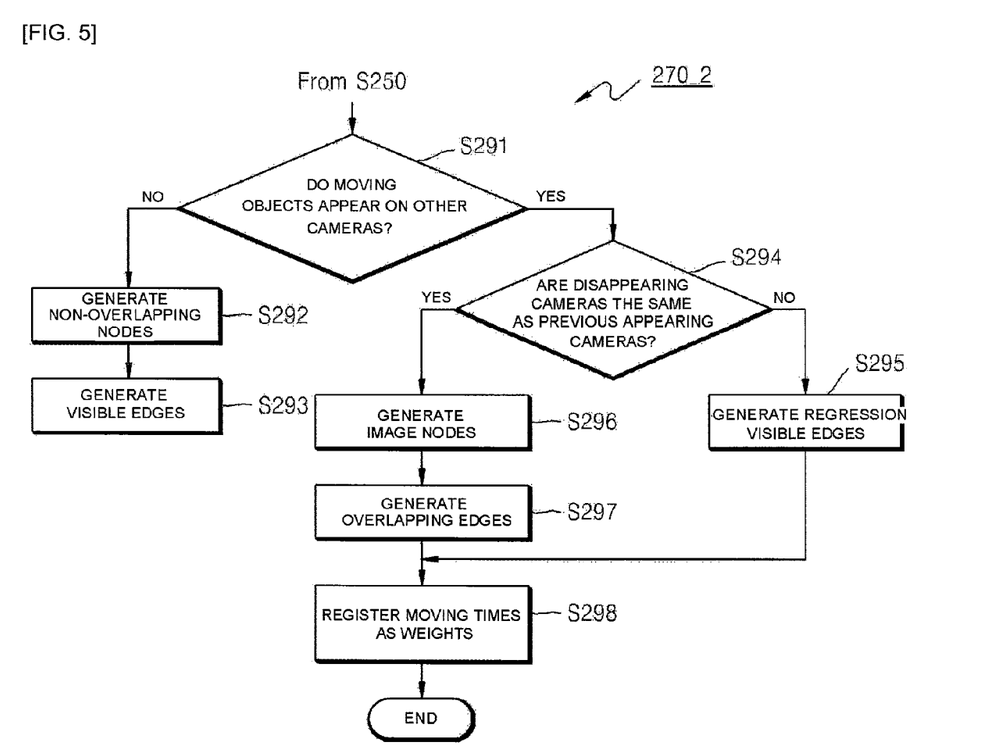
FIG. 5 is a flowchart of an other part 270_2 of operation 270 of the method of FIG. 2.

FIG. 5 is a flowchart of other part 270_2 of operation 270 of the method of FIG. 2. If the moving objects disappear from the cameras, the topology inferrer 190 determines whether the moving objects appear on other cameras except the to disappearing cameras, in operation S291.

If the moving object does not appear on the other cameras, the topology inferrer 190 generates non-overlapping nodes in operation S292 and generates visible edges to the non-overlapping nodes in operation S293. If the moving objects appear on the other cameras, the topology inferrer 190 determines whether previous appearing cameras are the same as the disappearing cameras, in operation 294. If it is determined in operation S294 that the previous appearing cameras are not the same as the disappearing cameras, the topology inferrer 190 generates camera nodes or regression visible edges in operation S295.

In more detail, if the previous appearing camera is not the same as the disappearing camera, the topology inferrer 190 generates image nodes of the disappearing camera in operation S296 and generates overlapping edges to the image nodes in operation S297. Here, the topology inferrer 190 registers the moving times as weights of the overlapping edges in operation S298.

If the previous appearing cameras are the same as the disappearing camera, the topology inferrer 190 generates regression visible edges regressing to the disappearing cameras. Here, the topology inferrer 190 registers the moving times as weights of the regression visible edges in operation S298.

In the present embodiment, the above-described operations may be repeated on moving objects, which enter and move within the network 115 of cameras, to train the moving objects so as to constitute a space-time topology relation of the network 115. Tracking of the moving objects within the network 115 may be accurately performed using such a topology relation.

An example of constituting a space-time topology relation of the network 115 in a real space will now be described with reference to FIGS. 6 through 9.

Figure 6:
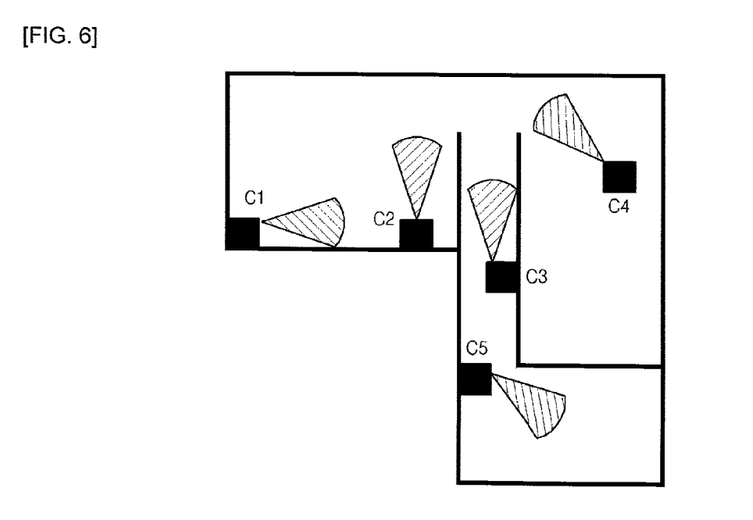
FIG. 6 schematically illustrates a network space of multiple cameras in which a topology inferring method of an embodiment of the present invention is experimented.
Figure 7:
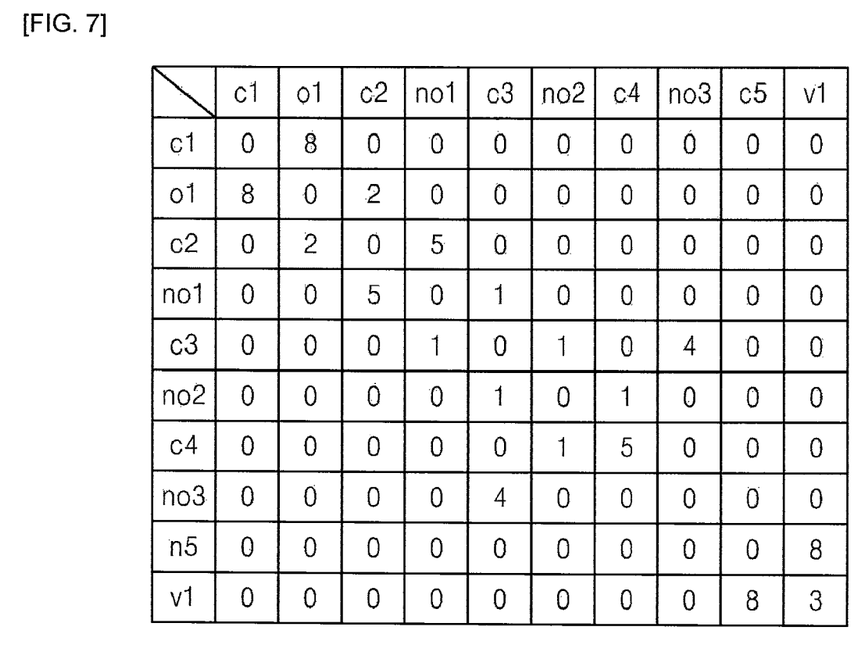
FIG. 7 illustrates data experimented in the network space of FIG. 6, according to an embodiment of the present invention.
Figure 8:
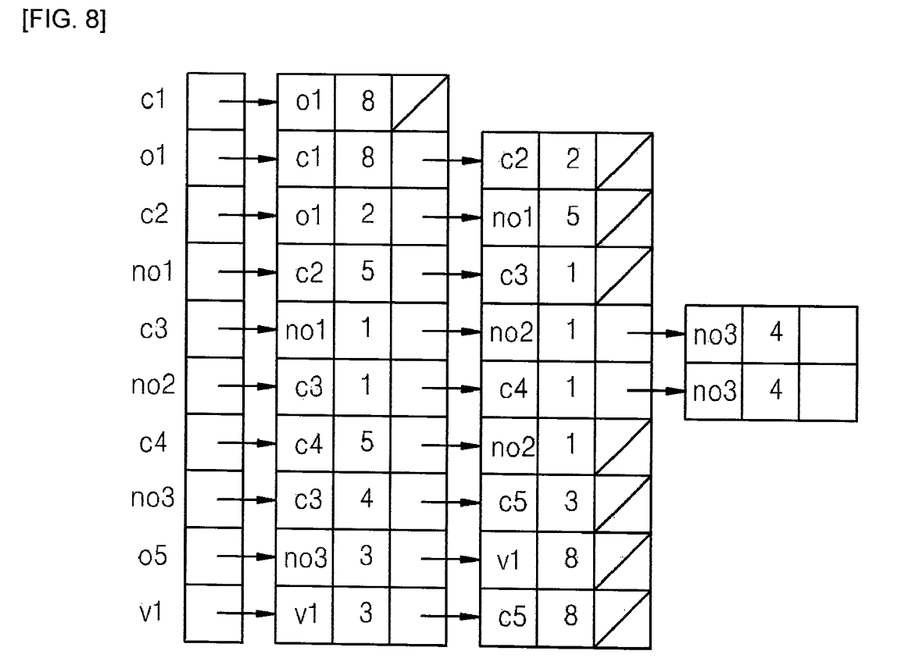
FIG. 8 illustrates data experimented in the network space of FIG. 6, according to another embodiment of the present invention.
Figure 9:
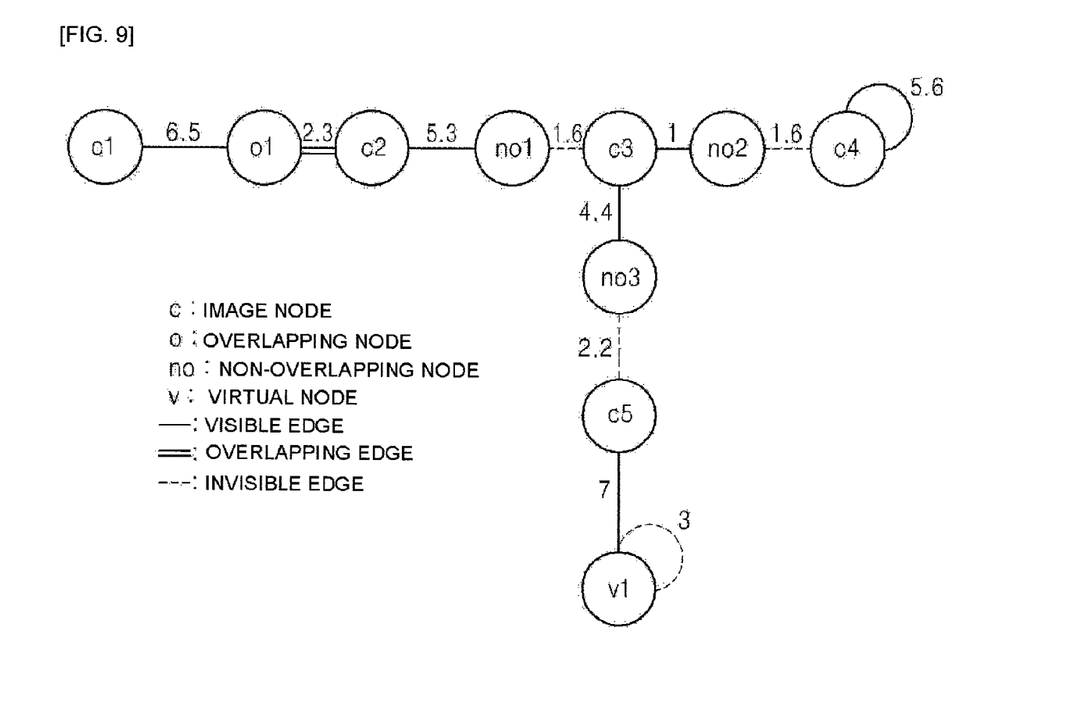
FIG. 9 illustrates topology relations among multiple cameras that are inferred using the data of FIGS. 7 and 8.

FIG. 6 schematically illustrates a network space of multiple cameras on which a topology tracking method of an embodiment of the present invention is experimented. FIGS. 7 and 8 respectively illustrate data obtained from the experiment performed in the network space of FIG. 6. FIG. 9 illustrates a topology relation of a network of multiple cameras that is inferred using the data of FIGS. 7 and 8. The experiment in the network space of FIG. 6 is performed under the following conditions.

A method of used in the experiment is realized using C++ and OpenCV under the environments of Intel Dual Core 2.4 GHz CPU and Windows XP of 1 GB Memory Spec. Also, Samsung Dome Camera SID-45 is used as cameras, and obtained images of 320×240 are processed as 15 frames per second. In the experiment, appearing and disappearing cameras are detected from FOVs of cameras with movements of a user within a building in the network space of FIG. 6 to analyze topology relations among the cameras.

Table below shows movements of moving objects in the network space of FIG. 6 for 20-minute learning in time order.

| Time | Camera | Appear | Re-Appear | Disappear | Movement Time | Transition Time |
|---|---|---|---|---|---|---|
| 09:45:22:12 | c1 | p1 | | | | |
| 09:45:26:87 | c4 | p2 | | | | |
| 09:45:30:34 | c2 | | p1 | | 8 | |
| 09:45:31:68 | c4 | | p2 | | 5 | |
| 09:45:32:56 | c1 | | | p1 | 10 | |
| 09:45:32:81 | c3 | | p2 | | | 1 |
| 09:45:37:41 | c2 | | | p1 | 7 | |
| 09:45:37:94 | c3 | | | p2 | 5 | |
| 09:45:38:23 | c3 | | p1 | | | 1 |
| 09:45:39:18 | c3 | | | p1 | 1 | |
| 09:45:40:76 | c4 | | p1 | | | 1 |
| 09:45:40:56 | c5 | | p2 | | | 3 |
| 09:45:45:24 | c4 | | | p1 | 5 | |
| 09:45:46:74 | c3 | | p1 | | | 1 |
| 09:45:48:21 | c5 | | | p2 | 8 | |
| 09:45:51:81 | c3 | | | p1 | 5 | |
| 09:45:54:81 | c5 | | p1 | | | 3 |
| 09:46:02:64 | c5 | | | p1 | 8 | |
| 09:46:03:37 | c5 | p3 | | | | |
| 09:46:05:15 | c5 | | p1 | | | −3 |
| 09:46:11:37 | c5 | | | p3 | 8 | |

As shown in Table above, three moving objects p1, p2, and p3 move for about 50 seconds in the network space of FIG. 6. The movement of the moving object p1 will now be described.

The moving object p1 appears on a first camera C1 at 09:45:22:12. In this case, the moving object p1 is registered in operation S272, and an image node c1 is generated in operation S273.

The moving object p1 re-appears on a second camera C2 at 09:45:30:34 but keeps appearing on the first camera C1. In this case, an overlapping node o1 is generated in operation S279, and a visible edge from the image node c1 to the overlapping node o1 is generated in operation 280. About 8 seconds are required from the appearance of the moving object p1 on the first camera C1 to the re-appearance of the moving object p1 on the second camera C2. Thus, "8" is registered as a weight of the visible edge to the overlapping node o1 in operation is S283.

The moving object p1 disappears from the first camera C1 at 09:45:32:56. However, since the moving object p1 keeps appearing on the second camera C2, an image node c2 is generated in operation S296, an overlapping edge from the overlapping node o1 to the image node c2 is generated in operation S297, and "2" is registered as a weight in operation S298. The moving object p1 disappears from the second camera C2 at 09:45:37:41 and does not appear on other cameras. Thus, a non-overlapping node no1 is generated in operation S292, a visible edge from the image node c2 to the non-overlapping node no1 is generated in operation S293, and "5 is registered as a weight in operation 298.

The moving object p1 re-appears on a third camera C3 at 09:45:38:23. Thus, an image node c3 is generated in operation S281, an invisible edge to the image node c3 is generated in operation S282, and "1" is registered as a weight in operation S283. The moving object p1 disappears from the third camera C3 at 09:45:39:18. Thus, a non-overlapping node no2 is generated in operation S292, an invisible edge from the image node c3 to the non-overlapping node no3 is generated in operation S293, and "1" is registered as a weight in operation S298.

The moving object p1 re-appears on a fourth camera C4 at 09:45:40:76. Thus, an image node c4 is generated in operation S281, an invisible edge to the image node c4 is generated in operation S282, and "1" is registered as a weight in operation S283. The moving object p1 disappears from the fourth camera C4 at 09:45:45:24. Here, since a disappearing camera is the same as the fourth camera C4, a regression visible edge is generated in operation S295, and "5" is registered as a weight in operation S298.

The moving object p1 re-appears on the third camera C3 at 09:45:46:74. A node and an edge related to the re-appearance have been already generated, and thus only a transition time is required to be confirmed. The moving object p1 disappears from the third camera C3 and re-appears on a fifth camera C5 at 09:45:51:81. Thus, a non-overlapping node no3 and an image node c5 are generated in operations S292 and 281, respectively, visible and invisible edges are generated in operations S293 and 282, respectively, and "4" and "3" are registered as weights in operations S298 and 283, respectively.

The moving object p1 disappears from the fifth camera C5 at 09:46:02:64 and then re-appears on the fifth camera C5 at 09:46:05:15. Here, a non-overlapping node, which is to be generated when the moving object p1 disappears, is required to be generated. However, since the moving object p1 disappears from and re-appears on the fifth camera C5, not a non-overlapping node but a virtual node v1 is generated in operation S276. In this case, a visible edge from the image node c5 to the virtual node v1 is generated in operation S293, a regression invisible edge at the virtual node v1 is generated in operation S277, and weights "8" and "3" are registered in operations S298 and S283, respectively.

According to the above embodiments described with reference to FIGS. 1 through 5, nodes and edges may be generated and weights may be registered according to movements of the moving objects p2 and p3 using similar methods to the above-described method. Nodes and weights determined as described above are expressed as a matrix and a list in FIGS. 7 and 8, respectively. The matrix among neighboring nodes for the moving object p1 is illustrated in FIG. 7, and the list of edges and weights among the neighboring nodes is illustrated in FIG. 8.

The above-described process may be repeated on moving objects that move within a network of multiple cameras, using the above-described method, to learn space-time topology relations among the multiple cameras within the network.

The learned space-time topology relations among the multiple cameras may be expressed as a topology-weighted graph G as illustrated in FIG. 9. Referring FIG. 9, the topology-weighted graph G is formed of nodes and edges. The nodes include image nodes, overlapping nodes, non-overlapping nodes, virtual nodes, and the edges include visible edges, invisible edges, and overlapping edges.

Links among nodes are constituted using direction information on which a moving object appears and disappears, and a difference between an appearing time and a disappearing time corresponds to a moving time at which the moving object moves. Thus, the moving time is registered as a weight of an edge between nodes.

An overlapping edge refers to a case where a moving object appears on two or more cameras. Thus, a movement direction of the moving object may be analyzed to infer angles among cameras. In particular, in the case of a passage in a building or a road in which vehicles move, moving patterns and paths of people or vehicles are constant. Thus, an inference as described above may be made. As described above, a space-time topology may be automatically constituted through learning that is performed for a predetermined time.

As described above, a topology relation of a network of multiple cameras, including distances among the multiple cameras, distances from moving objects to the multiple cameras, angles of the multiple cameras, etc., may be constituted using learning according to the present invention. Movements of the moving objects including persons may be accurately tracked using the topology relation. In other words, the moving objects may be sequentially tracked from the multiple cameras using external identifiers, haunting directions, time differences, etc. of the moving objects that are obtained from the topology relation.

Object tracking technology for multiple cameras realized in embodiments of the present invention may be widely applied in a home network field for maintaining safety within a security requiring building or a residential place such an apartment complex.

The embodiments of the present invention can be written as computer programs and can be implemented in general-use digital computers that execute the programs using a computer readable recording medium. Also, a structure of data used in the above embodiments can be recorded on a computer readable recording medium through several means. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

An apparatus and a method for tracking movements of objects to infer a topology of a network of multiple cameras may be applied to ubiquitous industries including home automation, etc.

The invention claimed is:

1. A method of tracking movements of objects to infer a topology of a network of multiple cameras, comprising:
   sequentially obtaining images from the multiple cameras;
   extracting at least one moving object from each of the obtained images;
   determining and registering appearing cameras and appearing times at which the moving objects appear, and disappearing cameras and disappearing times at which the moving objects disappear, for the multiple cameras; and
   inferring the topology of the network using the appearing cameras and appearing times and the disappearing cameras and disappearing times,
   wherein the inference of the topology comprises:
   if the moving objects appear on the cameras, determining whether the moving objects are new moving objects;
   if the moving objects are the new moving objects, registering the moving objects and generating image nodes of the appearing cameras, and if the moving objects are registered moving objects, comparing moving times of the moving objects with a threshold moving time; and
   if the moving times are greater than the threshold moving time, re-registering the moving objects as new moving objects and generating image nodes of the appearing cameras, and if the moving times are not greater than the threshold moving time, comparing the appearing cameras with previous disappearing cameras to determine the topology of the network, wherein the determination of the topology of the network comprises:
if the previous disappearing cameras are not registered or the appearing cameras of the moving objects are not the same as the previous disappearing cameras, determining whether the moving objects disappear from other cameras to generate image nodes or overlapping nodes; and
if the appearing cameras of the moving objects are the same as the previous disappearing cameras, generating virtual nodes of the appearing cameras,
wherein the generation of the virtual nodes comprises generating invisible edges to the virtual nodes,
wherein weights of the invisible edges to the virtual nodes are the moving times.

2. The method of claim 1, wherein the extraction of the moving objects comprises removing background areas from the obtained images to obtain foreground areas so as to extract the foreground areas as the moving objects.

3. The method of claim 1, wherein the determination and registration of the appearing cameras and appearing times and the disappearing cameras and disappearing times comprise:
if the moving objects appear on the cameras, determining the cameras on which the moving objects appear, as the appearing cameras and times at which the moving objects appear, as the appearing times; and
if the moving objects disappear from the cameras, determining the cameras from which the moving objects disappear, as the disappearing cameras and times at which the moving objects disappear, as the disappearing times.

4. The method of claim 1, wherein the extraction of the moving objects comprises:
extracting characteristics of the moving objects; and
the determination of whether the moving objects are the new moving objects comprises comparing the characteristics of the moving objects with characteristics of previously extracted moving objects to determine whether the moving objects are the new moving objects.

5. The method of claim 1, wherein the generation of the image nodes or the overlapping nodes comprises:
if the moving objects do not appear on the other cameras, generating the image nodes of the appearing cameras; and
if the moving objects appear on the other cameras, generating overlapping nodes between the appearing cameras and the other cameras.

6. The method of claim 1, further comprising:
if the moving objects disappear from the cameras, determining whether the moving objects appear on other cameras except the disappearing cameras;
if the moving objects do not appear on the other cameras, generating non-overlapping nodes; and
if the moving objects appear on the other cameras, determining whether previous appearing cameras are the same as the disappearing cameras to generate camera nodes or regression visible edges.

7. The method of claim 6, wherein the generation of the camera nodes or the regression visible edges comprises:
if the previous appearing cameras are not the same as the disappearing cameras, generating image nodes of the disappearing cameras; and
if the previous appearing cameras are the same as the disappearing cameras, generating regression visible edges that regress to the disappearing cameras.

8. A method of tracking movements of objects to infer a topology of a network of multiple cameras, comprising:
sequentially obtaining images from the multiple cameras;
extracting at least one moving object from each of the obtained images;
determining and registering appearing cameras and appearing times at which the moving objects appear, and disappearing cameras and disappearing times at which the moving objects disappear, for the multiple cameras; and
inferring the topology of the network using the appearing cameras and appearing times and the disappearing cameras and disappearing times,
wherein the inference of the topology comprises:
if the moving objects appear on the cameras, determining whether the moving objects are new moving objects;
if the moving objects are the new moving objects, registering the moving objects and generating image nodes of the appearing cameras, and if the moving objects are registered moving objects, comparing moving times of the moving objects with a threshold moving time; and
if the moving times are greater than the threshold moving time, re-registering the moving objects as new moving objects and generating image nodes of the appearing cameras, and if the moving times are not greater than the threshold moving time, comparing the appearing cameras with previous disappearing cameras to determine the topology of the network,
the method further comprising:
if the moving objects disappear from the cameras, determining whether the moving objects appear on other cameras except the disappearing cameras;
if the moving objects do not appear on the other cameras, generating non-overlapping nodes; and
if the moving objects appear on the other cameras, determining whether previous appearing cameras are the same as the disappearing cameras to generate camera nodes or regression visible edges,
wherein the generation of the camera nodes or the regression visible edges comprises:
if the previous appearing cameras are not the same as the disappearing cameras, generating image nodes of the disappearing cameras; and
if the previous appearing cameras are the same as the disappearing cameras, generating regression visible edges that regress to the disappearing cameras,
wherein the generation of the image nodes of the disappearing cameras comprises generating overlapping edges to the image nodes, wherein weights of the overlapping edges to the image nodes and weights at the regression visible edges are the moving times.

9. A method of tracking movements of objects to infer a topology of a network of multiple cameras, comprising:
sequentially obtaining images from the multiple cameras;
extracting at least one moving object from each of the obtained images;
determining and registering appearing cameras and appearing times at which the moving objects appear, and disappearing cameras and disappearing times at which the moving objects disappear, for the multiple cameras; and
inferring the topology of the network using the appearing cameras and appearing times and the disappearing cameras and disappearing times,
wherein the inference of the topology comprises:
if the moving objects appear on the cameras, determining whether the moving objects are new moving objects;
if the moving objects are the new moving objects, registering the moving objects and generating image nodes of the appearing cameras, and if the moving objects are registered moving objects, comparing moving times of the moving objects with a threshold moving time; and if the moving times are greater than the threshold moving time, re-registering the moving objects as new moving objects and generating image nodes of the appearing cameras, and if the moving times are not greater than the threshold moving time, comparing the appearing cameras with previous disappearing cameras to determine the topology of the network, wherein the determination of the topology of the network comprises:

if the previous disappearing cameras are not registered or the appearing cameras of the moving objects are not the same as the previous disappearing cameras, determining whether the moving objects disappear from other cameras to generate image nodes or overlapping nodes; and if the appearing cameras of the moving objects are the same as the previous disappearing cameras, generating virtual nodes of the appearing cameras, wherein the generation of the image nodes or the overlapping nodes comprises:

if the moving objects do not appear on the other cameras, generating the image nodes of the appearing cameras; and if the moving objects appear on the other cameras, generating overlapping nodes between the appearing cameras and the other cameras, wherein the generation of the image nodes comprises:

generating invisible edges to the image nodes; and the generation of the overlapping nodes comprises generating visible edges to the overlapping nodes, wherein weights of the invisible edges to the image nodes and weights of the visible edges to the overlapping nodes are the moving times.

* * * * *

UNITED STATES PATENT AND TRADEMARK OFFICE
CERTIFICATE OF CORRECTION

| | | |
|---|---|---|
| PATENT NO. | : 8,300,102 B2 | Page 1 of 1 |
| APPLICATION NO. | : 12/675682 | |
| DATED | : October 30, 2012 | |
| INVENTOR(S) | : Nam et al. | |

It is certified that error appears in the above-identified patent and that said Letters Patent is hereby corrected as shown below:

Title Page, Item (57) ABSTRACT

Line 1, change "Provided are an" to --An--;

Line 8, delete ", for the multiple cameras";

Line 12, delete ", for the multiple cameras";

Line 18, delete "Therefore, the apparatus accurately";

Delete lines 19 through 23.

Signed and Sealed this
Fifth Day of February, 2013

Teresa Stanek Rea
*Acting Director of the United States Patent and Trademark Office*